(12) United States Patent
Shanmugam et al.

(10) Patent No.: US 11,401,742 B1
(45) Date of Patent: Aug. 2, 2022

(54) LOAD RESTRAINING APPARATUS FOR PERFORMING A CONTROLLED FALL OF UNSECURED FREIGHT

(71) Applicant: Amazon Technologies, Inc., Seattle, WA (US)

(72) Inventors: Niveda Chandrasekar Shanmugam, Alpharetta, GA (US); Mark John Stradling, Temecula, CA (US); Clayton Russell Foster, Moreno Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 16/696,678

(22) Filed: Nov. 26, 2019

(51) Int. Cl.
| | |
|---|---|
| *E05C 17/58* | (2006.01) |
| *E05F 3/00* | (2006.01) |
| *E05C 17/02* | (2006.01) |
| *B60P 7/08* | (2006.01) |

(52) U.S. Cl.
CPC ............ *E05C 17/58* (2013.01); *B60P 7/0823* (2013.01); *E05C 17/02* (2013.01); *E05F 3/00* (2013.01); *E05Y 2900/516* (2013.01); *E05Y 2900/531* (2013.01)

(58) Field of Classification Search
CPC .. E05F 3/00; E05C 17/02; E05C 17/58; B60P 7/0823
USPC ..................... 410/118, 96, 100, 117; 248/499
See application file for complete search history.

(56) References Cited

U.S. PATENT DOCUMENTS

| | | | | |
|---|---|---|---|---|
| 6,152,664 A | * | 11/2000 | Dew ...................... | B60P 7/0876 410/97 |
| 8,870,504 B2 | * | 10/2014 | Wienke .................. | B60R 21/06 410/97 |
| 8,974,158 B1 | * | 3/2015 | Hatch ................... | B60P 7/0876 410/97 |
| 9,827,896 B1 | * | 11/2017 | Dankert ................ | B60P 7/0853 |
| 10,882,440 B1 | * | 1/2021 | Hadley ................ | B62D 63/062 |

* cited by examiner

*Primary Examiner* — D Glenn Dayoan
*Assistant Examiner* — Sunsurraye Westbrook
(74) *Attorney, Agent, or Firm* — Athorus, PLLC

(57) ABSTRACT

Described are a load restraining apparatus that can facilitate performing controlled falls of unsecured freight that may be leaning against swing doors of a trailer. The described load restraining apparatus includes a first member, a second member, a third member, and a linking assembly that facilitates performing a controlled fall of unsecured freight leaning on swing doors of a trailer from a safe distance.

20 Claims, 12 Drawing Sheets

LOAD RESTRAINING APPARATUS FOR PERFORMING A CONTROLLED FALL OF UNSECURED FREIGHT

BACKGROUND

Injuries can frequently occur when unloading freight from trailers. One such activity during which injuries are common include opening swing doors of trailers. This can be particularly hazardous when the freight inside the trailer is unsecured. Unsecured freight can lean against the swing doors and can result in the swing doors being violently swung open and/or an avalanche of the freight falling on the operator during the door opening operation. Although safety straps have been employed to restrain the doors from fully opening, and thus preventing the unsecured freight from falling out of the trailer onto the operator, removing the safety straps in a safe manner can be difficult.

DETAILED DESCRIPTION

Figure 1A:
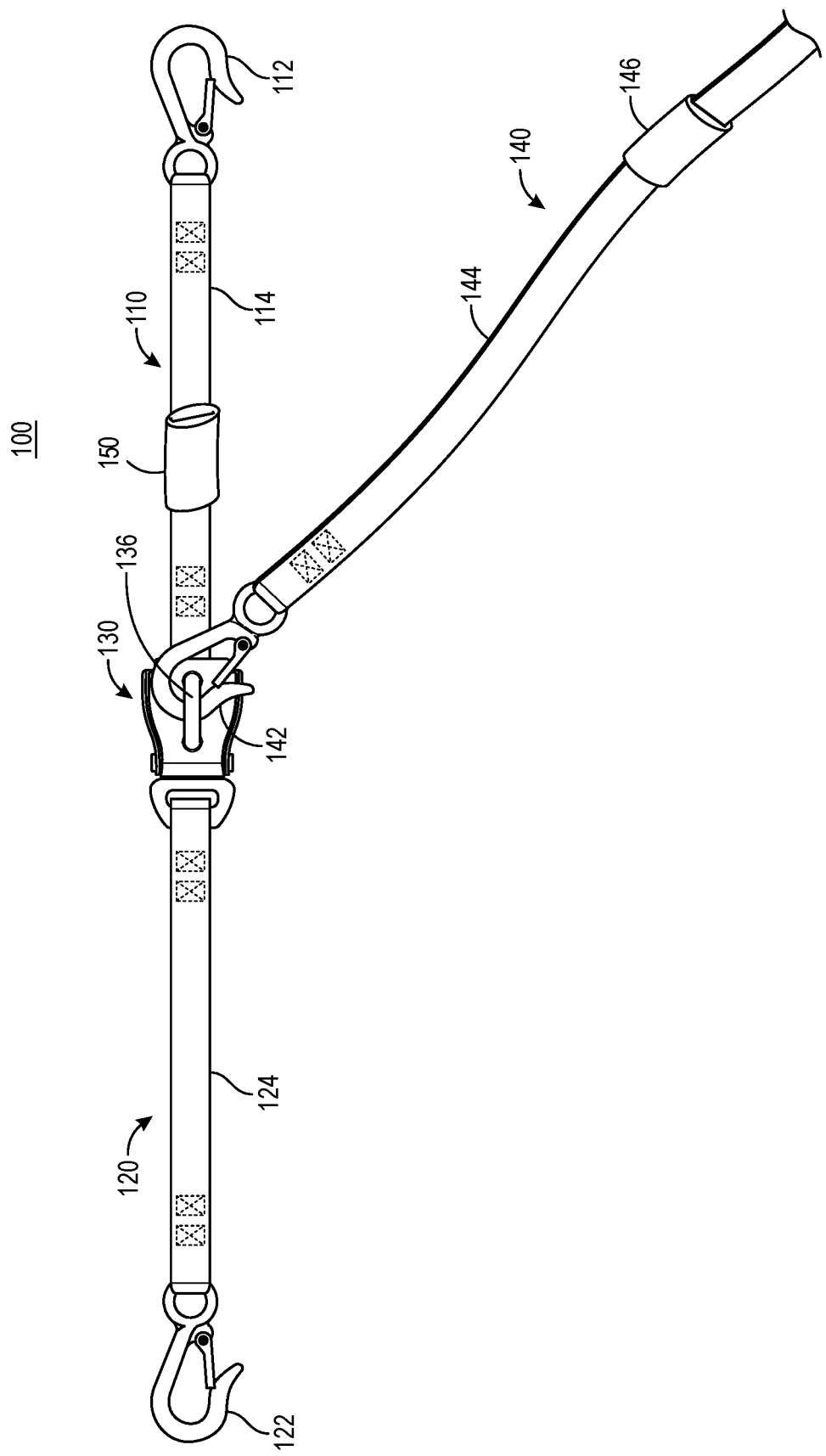
FIGS. 1A and 1B are illustrations of an exemplary load restraining apparatus in accordance with embodiments of the present disclosure.

As is set forth in greater detail below, embodiments of the present disclosure are generally directed to a load restraining apparatus that can facilitate performing controlled falls of unsecured freight that may be leaning against swing doors of a trailer. Unsecured freight that is leaning against swing doors of a trailer can cause the doors to swing open violently and/or create an avalanche of freight to fall on an operator who may be opening the doors. This can result in severe injury to the operator. Embodiments of the present disclosure can provide a load restraining apparatus that can facilitate performing a controlled fall of unsecured freight leaning on swing doors of a trailer.

As described herein, the load restraining apparatus according to embodiments of the present disclosure can include a first member, a second member, a third member, and a linking assembly. The first and second members can include, for example, a length of nylon webbing/rope/cord(s) and securing assemblies to couple the first and second members to anchors on the trailer to be unloaded (e.g., to the hasps of the trailer). For example, the securing assemblies can include hooks, locking hooks, carabiners, or any mechanism that can provide easy coupling and decoupling of the first and second members to and from the trailer. The linking assembly can releasably couple the first member to the second member and can facilitate decoupling of the first and second members while under a load (e.g., from the unsecured freight leaning against the swing doors of the trailer). Accordingly, the linking assembly can include any mechanism that can couple the first member to the second member and can be disengaged (to decouple the first member from the second member) while under a load. For example, the linking assembly can include a lift lever buckle assembly, a push-button buckle assembly, a pin and loop assembly, hook-and-loop fasteners, etc. The first member, the second member, and the linking assembly preferably include components and are configured to withstand loads and/or forces that may be sufficient to restrain unsecured freight in a trailer (e.g., 500 lbs., 800 lbs., 1,000 lbs., 2,000 lbs., 2,500 lbs., 5,000 lbs., 10,000 lbs., etc.).

The third member may be coupled to the linking assembly and can allow an operator to decouple the first member from the second member at a safe distance from the trailer. For example, the third member can include a connector to couple third member to the linking assembly and a length that enables the operator to position himself/herself at a safe distance from the trailer. The operator can apply a force on the third member, which can be translated to the linking assembly, thereby disengaging the linking assembly so as to decouple the first member from the second member. According to certain embodiments, the third member can include a length of nylon strap/webbing/rope/cord(s) and a connector, such as a hook, which can be coupled to a connector disposed on the linking assembly. Additionally, the third member can include an indicator, which can signify a safe distance from the doors and/or rear of the trailer.

In use, the first member and the second member can be coupled to anchors on the trailer to be unloaded. For example, securing assemblies of the first member and the second member can each be secured to hasps disposed on the rear of the trailer. The first member is preferably coupled to the second member via the linking assembly (before or after securing the securing assemblies of the first and second members to the anchors on the trailer). After the first and second members are secured to the trailer, an operator may attempt to open the doors of the trailer. For example, while attempting to open swing doors of the trailer, the operator may feel for pressure on the doors, latch, handle, etc. of the trailer to ascertain whether unsecured freight may be leaning against the doors of the trailer. In situations where unsecured freight is leaning on the doors, the freight may force the doors into a partially open position. The load restraining apparatus, which is coupled to anchors (e.g., hasps) on the trailer, can maintain the doors in a partially open position, thereby restraining the freight and preventing the freight from falling out of the trailer. Next, the operator can position himself/herself at a location remote from the rear of the trailer from which the operator can safely perform a controlled fall of the freight. A safe distance from the rear of the trailer may be denoted by an indicator on the third member. Once at a safe distance from the trailer, the operator can utilize the third member to disengage the linking assembly, thereby decoupling the first member from the second member. With the first member decoupled from the second member, the door and the freight are no longer restrained, thereby allowing the doors of the trailer to open further and allow the freight to fall from the trailer while the operator is at a safe distance from the trailer.

Figure 1B:
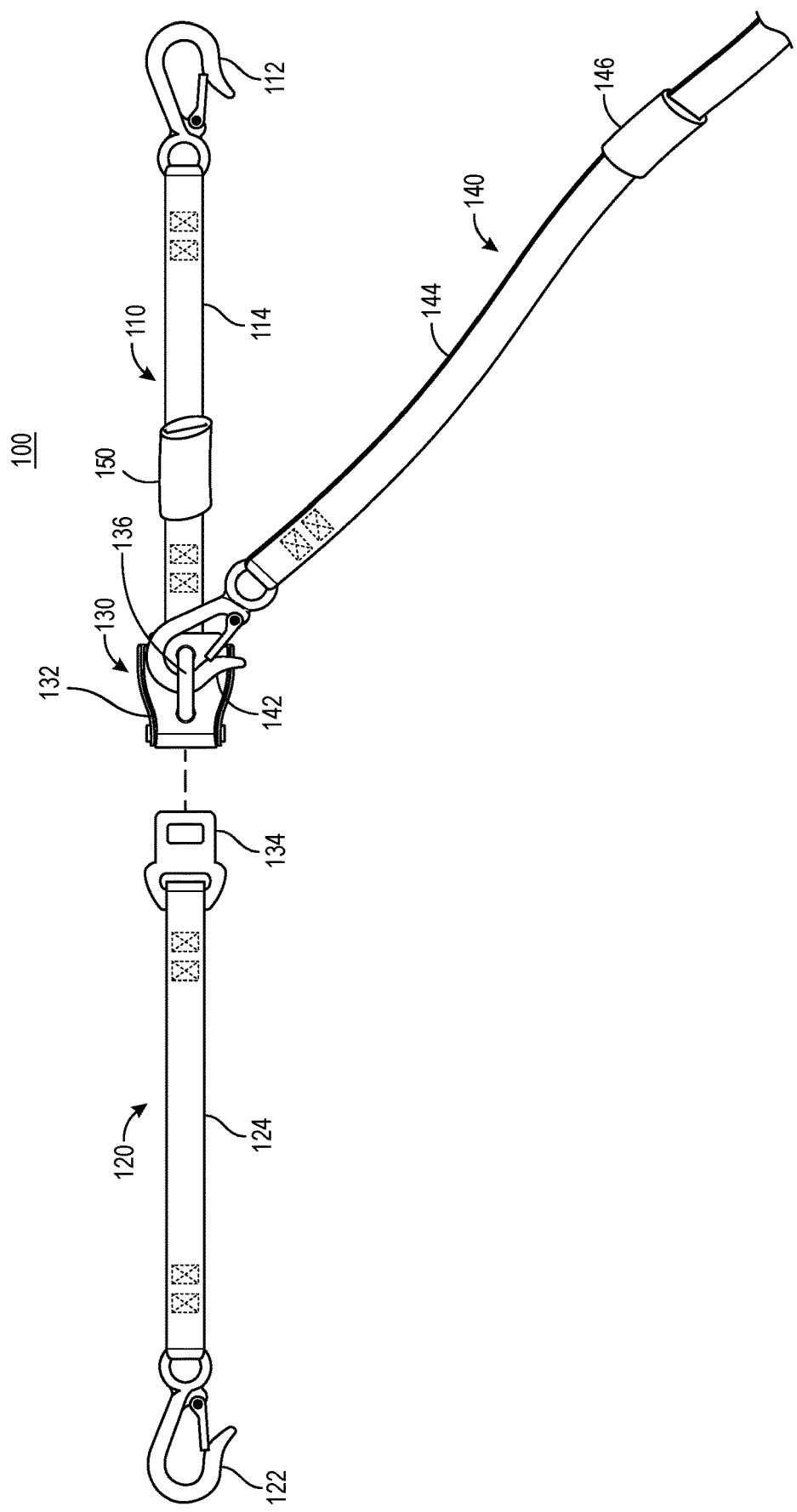

FIGS. 1A and 1B show exemplary load restraining apparatus 100, in accordance with embodiments of the present disclosure. As shown in FIGS. 1A and 1B, load restraining apparatus 100 can include first member 110, second member 120, linking assembly 130, and third member 140. FIG. 1A shows load restraining apparatus 100 in a coupled arrangement, where linking assembly 130 is engaged such that first member 110 is coupled to second member 120. Conversely, FIG. 1B shows load restraining apparatus 100 in a decoupled arrangement, where linking assembly 130 is disengaged such that first member 110 is not coupled to second member 120. FIGS. 1A and 1B also show third member 140 coupled to linking assembly 130. As load restraining apparatus 100 may be used to restrain unsecured freight in a trailer, load restraining apparatus 100, including first member 110, second member 120, and linking assembly 130, are preferably constructed (and include components) to provide sufficient tensile strength to restrain loads of 500 lbs., 800 lbs., 1,000 lbs., 2,000 lbs., 2,500 lbs., 5,000 lbs., 10,000 lbs., or more.

As shown in FIGS. 1A and 1B, first member 110 can include securing assembly 112 and band portion 114. Similarly, second member 120 can include securing assembly 122 and band portion 124. Securing assembly 112 can be coupled to a first end of band portion 114 and can allow first member 110 to be secured to an anchor, such as a hasp of a trailer, to couple first member 110 to a rear of the trailer. Similarly, securing assembly 122 can be coupled to a first end of band portion 124 and can allow second member 120 to be secured to an anchor, such as another hasp of the trailer, to couple second member 120 to a rear of the trailer. According to certain embodiments, securing assemblies 112 and 122 can include hooks, carabiners, locking hooks, snap hooks, chains, clips, fasteners, etc. Band portions 114 and 124 can include any material that can provide flexibility and sufficient tensile strength, such as nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. According to embodiments of the present disclosure, securing assemblies 112 and 122 can be coupled to band portions 114 and 124, respectively, via one or more box stitches. The components, materials, and design of securing assemblies 112 and 122 and band portions 114 and 124 can be modified to obtain the desired tensile strength. For example, a width of band portions 114 and 124 can be selected (e.g., 1 inch, 2 inches, 3 inches, etc.) for a desired tensile strength and the manner in which securing assemblies 112 and 122 are coupled to band portions 114 and 124 (e.g., single box stitches, double box stitches, etc.) can also be modified to achieve a desired tensile strength. Optionally, at least one of first member 110 or second member 120 can include winching or ratcheting mechanism 150, by which a length of first member 110 and/or second member 120 can be adjusted.

As shown in FIGS. 1A and 1B, linking assembly 130 can be secured to the second ends of first member 110 and second member 120, respectively, to provide releasable coupling of first member 110 to second member 120. Similar to securing assemblies 112 and 122, linking assembly 130 can be coupled to the second ends of first member 110 and second member 120 via one or more box stitches. Linking assembly 130 can also include connector 136, which can provide a connection to third member 140. According to certain embodiments and as shown in FIG. 1B, linking assembly 130 can include a lift lever buckle assembly, which can include lever portion 132 and tongue portion 134. Tongue portion 134 may be configured to be received by and engage with lever portion 132. For example, tongue portion 134 can include a tab portion with an opening disposed therein, and lever portion 132 can include a lever with a protruding element that can be articulated between an engaged position and a disengaged position. In the engaged position, the tab of tongue portion 134 can be received by lever portion 132 and the protruding element of lever portion 132 can engage with the opening of tongue portion 134. According to certain aspects, the lever can be biased (e.g., via a spring) in the engaged position. The lever of lever portion 132 can be rotated to a disengaged position where the protruding element disengages the opening of tongue portion 134 to disengage and release tongue portion 134 from lever portion 132. As also shown in FIG. 1B, connector 136 can include a ring that is coupled to a surface of the lever of lever portion 132. For example, connector 136 can include a D-ring welded onto the surface of the lever of lever portion 132. Alternatively, linking assembly 130 can include any suitable mechanisms and/or components that can couple first member 110 to second member 120 while providing sufficient tensile strength and the ability to disengage (e.g., to decouple first member 110 from second member 120) while under load. For example, linking assembly 130 can include a lift lever buckle assembly, a push-button buckle assembly, a loop and pin arrangement, a hook-and-loop fastener arrangement, a side release buckle assembly, a cam buckle assembly, a ratchet buckle assembly, a roller buckle assembly, a slide buckle assembly, a bar buckle assembly, etc. According to certain embodiments of the present disclosure, under a load of approximately 500 lbs., linking assembly 130 can be disengaged via application of a force of approximately 25 lbs., 50 lbs., 75 lbs., 100 lbs., or more.

As shown in FIGS. 1A and 1B, third member 140 can include connector 142 and band portion 144 and can be coupled to linking assembly 130 via connector 136 of linking assembly 130 and connector 142. With third member 140 coupled to linking assembly 130, third member 140 can facilitate disengagement of linking assembly 130 to decouple first member 110 from second member 120 from a safe distance. For example, third member 140 can be coupled to linking assembly 130 via connector 142 and connector 136, and band portion 144 can include a length sufficient to allow an operator of load restraining apparatus 100 to position himself/herself at a safe distance from a rear of the trailer being unloaded, from where he/she can safely perform a controlled fall of any unsecured freight. According to embodiments of the present disclosure, connector 142 can include hooks, carabiners, locking hooks, snap hooks, chains, clips, fasteners, etc. Further, band portion 144 can include any material that can provide flexibility and sufficient tensile strength, such as, nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. Further, connector 142 can be coupled to band portion 144 via one or more box stitches.

Third member 140 can also include indicator 146 that can inform the operator when a safe distance has been reached when third member 140 is stretched taut. For example, third member 140 can include a length of 8 feet, 10 feet, 12 feet, 15 feet, 20 feet, 25 feet, or any other length to allow an operator to position himself/herself at a distance of at least 8 feet, 10 feet, feet, 15 feet, 20 feet, 25 feet, or any other distance from a rear of the trailer being unloaded. Alternatively, third member 140 can include a length greater than a desirable safety distance and indicator 146 can be positioned at the desired safety distance (e.g., a distance of 8 feet, 10 feet, 12 feet, 15 feet, 20 feet, 25 feet, or any other distance from connector 142) so that the operator can ascertain the preferred safety distance from the trailer. For example, the operator may move along the length of band portion 144 in a direction away from the rear of the trailer until indicator 146 has been reached.

In operation, load restraining apparatus 100 can be used to perform a controlled fall of unsecured freight that may be leaning against swing doors of a trailer. For example, first member 110 can be coupled to an anchor, such as a hasp of a trailer, via securing assembly 112 and second member 120 can be coupled to a second anchor, such as a second hasp of the trailer, via securing assembly 122. Further, first member 110 may be coupled to second member 120 via linking assembly 130 and third member 140 may be coupled to linking assembly 130 via connector 136 of linking assembly 130 and connector 142. As the swing doors are opened, any unsecured freight that may be leaning against the doors may force the doors into an open position. In this situation, load restraining apparatus 100 may restrain the load from falling out of the trailer and can maintain the doors in a partially open position. Next, the operator can position himself/herself at a safe distance from the rear of the trailer where he/she can safely perform a controlled fall of the unsecured freight. For example, the operator may move along a length of band portion 144 of third member 140 until at least indicator 146 is reached. This may be at a distance of 8 feet, 10 feet, 12 feet, 15 feet, 20 feet, 25 feet, or any other distance. Preferably, the operator would be at a distance of at least 8 feet from the rear of the trailer. From this distance, the operator can apply a force to third member 140, which can be translated to linking assembly 130 to disengage linking assembly 130, thereby decoupling first member 110 from second member 120. For example, in an embodiment where linking assembly 130 includes a lift lever buckle assembly, the operator can apply a force in a direction that is substantially normal to a surface of the lever of lever portion 132. This force may be translated to the surface of lever portion 132, articulating the lever from an engaged position to a disengaged position, and thereby disengaging tongue portion 134 from lever portion 132 and decoupling first member 110 from second member 120, thus allowing the doors of the trailer to open further and allow the freight to fall from the trailer while the operator is at a safe distance from the trailer. According to certain embodiments of the present disclosure, under a load of approximately 500 lbs., tongue portion 134 can be disengaged from lever portion 132 via application of a force of approximately 25 lbs., 50 lbs., 75 lbs., 100 lbs., or more.

Figure 2A:
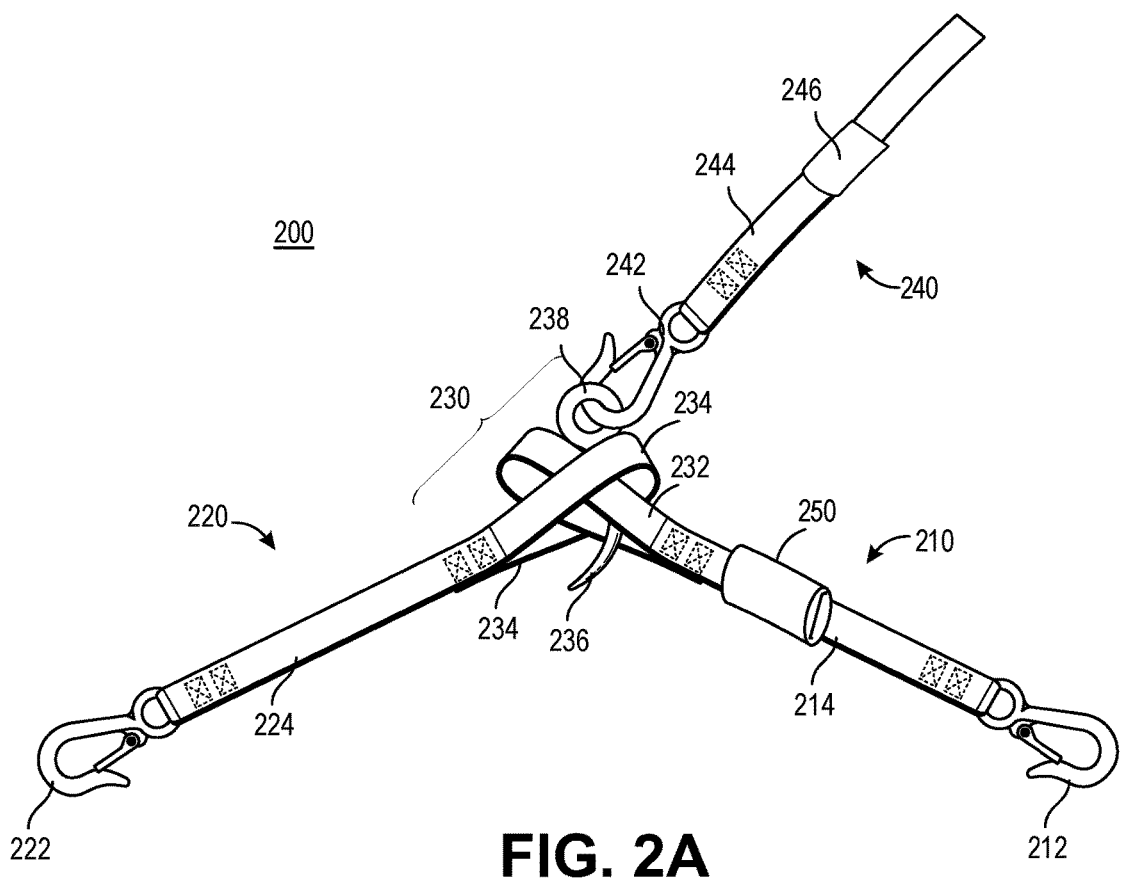
FIGS. 2A and 2B are illustrations of an exemplary load restraining apparatus in accordance with embodiments of the present disclosure.
Figure 2B:
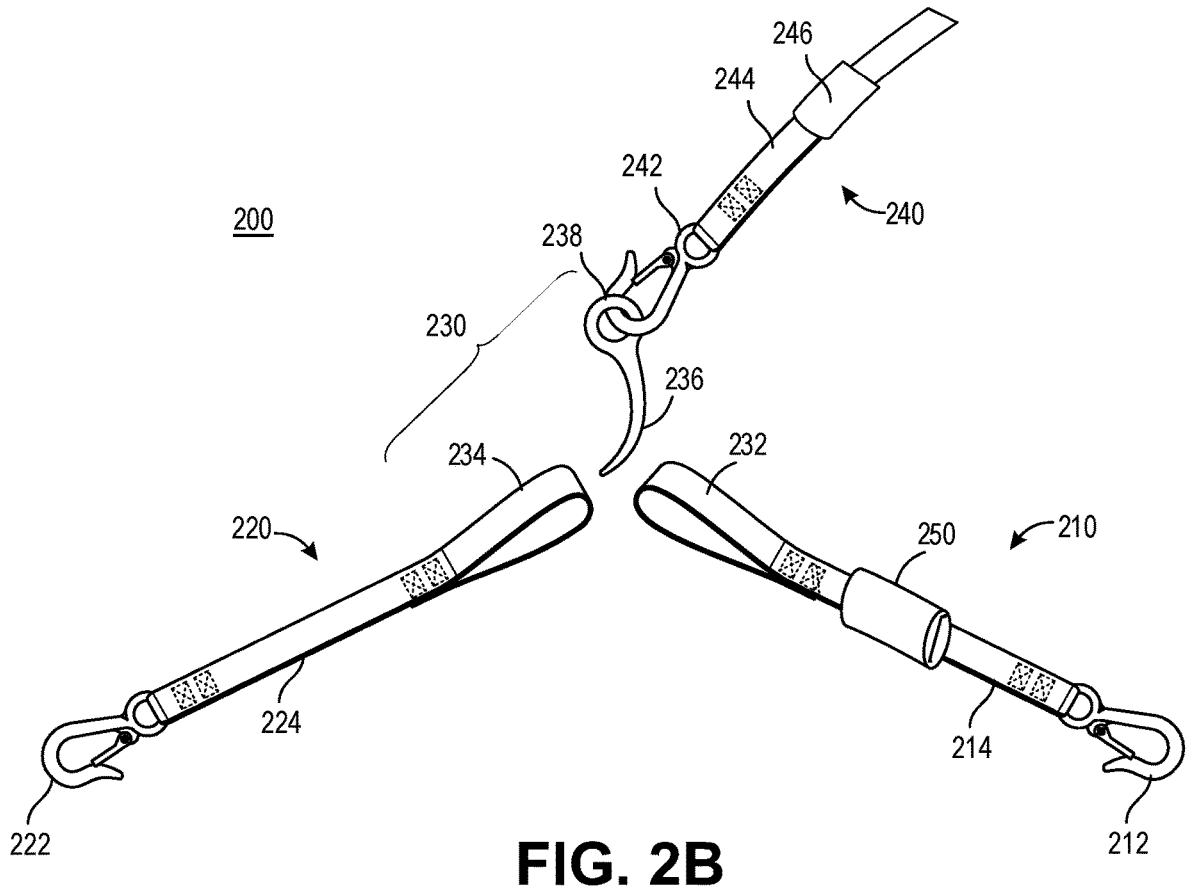

FIGS. 2A and 2B show load restraining apparatus 200 according to another embodiment of the present disclosure. Except where otherwise noted, reference numerals preceded by the number "2" shown in FIGS. 2A and 2B indicate components or features that are similar to components or features having reference numerals preceded by the number "1" in FIGS. 1A and 1B.

FIGS. 2A and 2B show load restraining apparatus 200 according to another embodiment of the present disclosure. Similar to load restraining apparatus 100 shown in FIGS. 1A and 1B, load restraining apparatus 200 shown in FIGS. 2A and 2B can include first member 210, second member 220, third member 240, and linking assembly 230. FIG. 2A shows load restraining apparatus 200 in a coupled arrangement, where linking assembly 230 is engaged such that first member 210 is coupled to second member 220. Conversely, FIG. 2B shows load restraining apparatus 200 in a decoupled arrangement, where linking assembly 230 is disengaged such that first member 210 is not coupled to second member 220. FIGS. 2A and 2B also show third member 240 coupled to linking assembly 230. As load restraining apparatus 200 may be used to restrain unsecured freight in a trailer, load restraining apparatus 200, including first member 210, second member 220, and linking assembly 230, are preferably constructed (and include components) to provide sufficient tensile strength to restrain loads of 500 lbs., 800 lbs., 1,000 lbs., 2,000 lbs., 2,500 lbs., 5,000 lbs., 10,000 lbs., or more.

As shown in FIGS. 2A and 2B, first member 210 can include securing assembly 212 and band portion 214. Similarly, second member 220 can include securing assembly 222 and band portion 224. Securing assembly 212 can be coupled to a first end of band portion 214 and can allow first member 210 to be secured to an anchor, such as a hasp of a trailer, to couple first member 210 to a rear of the trailer. Similarly, securing assembly 222 can be coupled to a first end of band portion 224 and can allow second member 220 to be secured to an anchor, such as a hasp of the trailer, to couple second member 220 to a rear of the trailer. According to certain embodiments, securing assemblies 212 and 222 can include hooks, carabiners, locking hooks, snap hooks, chains, clips, fasteners, etc. Band portions 214 and 224 can include any material that can provide flexibility and sufficient tensile strength, such as, nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. According to embodiments of the present disclosure, securing assemblies 212 and 222 can be coupled to band portions 214 and 224, respectively, via one or more box stitches. The components, materials, and design of securing assemblies 212 and 222 and band portions 214 and 224 can be modified to obtain the desired tensile strength. For example, a width of band portions 214 and 224 can be selected (e.g., 1 inch, 2 inches, 3 inches, etc.) for a desired tensile strength and the manner in which securing assemblies 212 and 222 are coupled to band portions 214 and 224 (e.g., single box stitches, double box stitches, etc.) can also be modified to achieve a desired tensile strength. According to certain aspects, at least one of first member 210 or second member 220 can include winching or ratcheting mechanism 250 by which a length of first member 210 and/or second member 220 can be adjusted.

As shown in FIGS. 2A and 2B, linking assembly 230 can be disposed at the second ends of first member 210 and second member 220, respectively, to provide releasable coupling of first member 210 to second member 220. According to one embodiment of the present disclosure and as shown in FIGS. 2A and 2B, linking assembly 230 can include a loop and pin arrangement. For example, linking assembly 230 can include first loop 232 formed at an end of first member 210, second loop 234 formed at an end of second member 220, and connecting pin 236. First loop 232 and second loop 234 can be formed, for example, by securing an end of first member 210 and second member 220 to band portions 214 and 224, respectively, via one or more box stitches. Connecting pin 236 can be threaded through first loop 232 and second loop 234 to provide releasable coupling of first member 210 to second member 220. For example, connecting pin 236 can be threaded through first loop 232 and second loop 234 and can be held in the threaded configuration by the tension present in first member 210 and second member 220. Accordingly, linking assembly 230 can be engaged with first member 210 coupled to second member 220 when connecting pin 236 is threaded through first loop 232 and second loop 234 and held in position by the tension in first member 210 and second member 220. Conversely, linking assembly 230 can be disengaged when connecting pin 236 is removed from first loop 232 and second loop 234. Connecting pin 236 can also include connector 238, which can provide a connection to third member 240. As described herein, third member 240 can facilitate disengagement of linking assembly 230 (e.g., to decouple first member 210 from second member 220) at a safe distance from the structure (e.g., trailer) to which load restraining apparatus 200 is secured.

As shown in FIGS. 2A and 2B, third member 240 can include connector 242 and band portion 244 and can be coupled to linking assembly 230 via connector 242 and connector 238 of connecting pin 236. With third member 240 coupled to linking assembly 230, third member 240 can facilitate disengagement of linking assembly 230 to decouple first member 210 from second member 220 from a safe distance. For example, third member 240 can be coupled to connecting pin 236 via connector 242 and connector 238 of connecting pin 236, and band portion 244 can include a length sufficient to allow an operator of load restraining apparatus 200 to position himself/herself at a safe distance from a rear of the trailer being unloaded, from where he/she can safely perform a controlled fall of any unsecured freight. According to embodiments of the present disclosure, connector 242 can include hooks, carabiners, locking hooks, snap hooks, chains, clips, fasteners, etc. Band portion 244 can include any material that can provide flexibility and sufficient tensile strength, such as, nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. Further, connector 242 can be coupled to band portion 244 via one or more box stitches.

Third member 240 can also include an indicator 246 that can inform the operator when a safe distance has been reached when third member 240 is stretched taut. For example, third member 240 can include a length of 8 feet, 10 feet, 12 feet, 15 feet, 20 feet, 25 feet, or any other length to allow an operator to position himself/herself at a distance of at least 8 feet, 10 feet, feet, 15 feet, 20 feet, 25 feet, or any other distance from a rear of the trailer being unloaded. Alternatively, third member 240 can include a length greater than a desirable safety distance and indicator 246 can be positioned at the desired safety distance (e.g., a distance of 8 feet, 10 feet, 12 feet, 15 feet, 20 feet, 25 feet, or any other distance from connector 242) so that the operator can ascertain the preferred safety distance from the trailer. For example, the operator may move along the length of band portion 244 in a direction away from the rear of the trailer until indicator 246 has been reached.

In operation, load restraining apparatus 200 can be used to perform a controlled fall of unsecured freight that may be leaning against swing doors of a trailer. For example, first member 210 can be coupled to an anchor, such as a hasp of a trailer, via securing assembly 212 and second member 220 can be coupled to a second anchor, such as a second hasp of the trailer, via securing assembly 222. Further, first member 210 may be coupled to second member 220 via linking assembly 230 and third member 240 may be coupled to connecting pin 236 of linking assembly 230 via connector 242 and connector 238 of connecting pin 236. As the swing doors are opened, any unsecured freight that may be leaning against the doors may force the doors into an open position. In this situation, load restraining apparatus 200 may restrain the load from falling out of the trailer and can maintain the doors in a partially open position. Next, the operator can position himself/herself at a safe distance from the rear of the trailer where he/she can safely perform a controlled fall of the unsecured freight. For example, the operator may move along a length of band portion 244 of third member 240 until at least indicator 246 is reached. This may be at a distance of 8 feet, 10 feet, 12 feet, 15 feet, 20 feet, 25 feet, or any other distance. Preferably, the operator would be at a distance of at least 8 feet from the rear of the trailer. From this distance, the operator can apply a force to third member 240, which can cause connecting pin 236 to become unthreaded from first loop 232 and second loop 234 to disengage linking assembly 230, and thereby decoupling first member 210 from second member 220, thus allowing the doors of the trailer to open further and allow the freight to fall from the trailer while the operator is at a safe distance from the trailer.

Figure 3A:
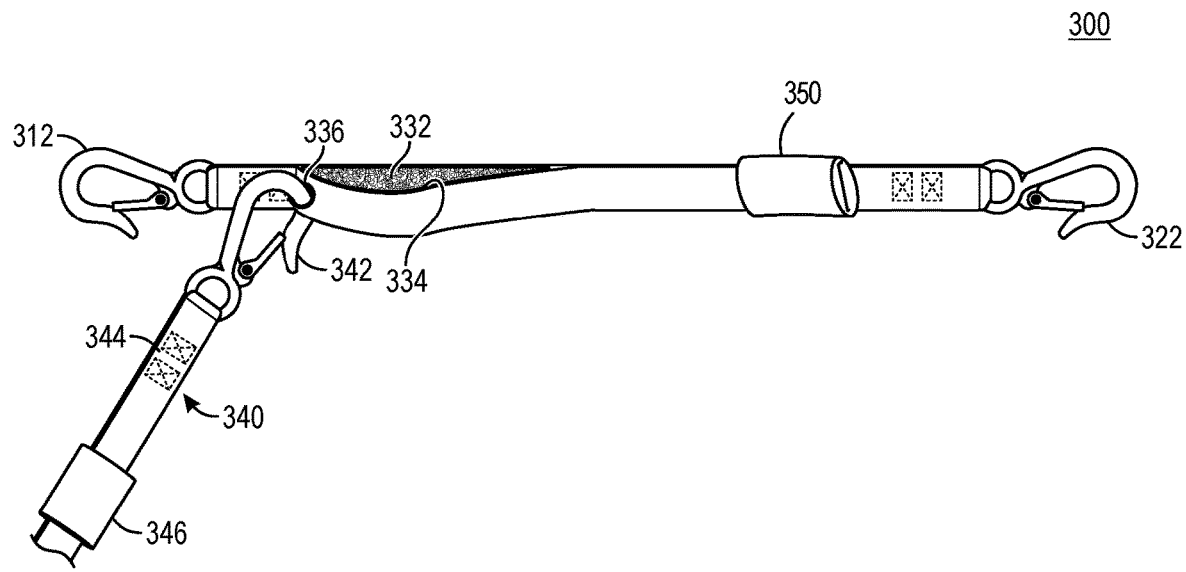
FIGS. 3A and 3B are illustrations of an exemplary load restraining apparatus in accordance with embodiments of the present disclosure.
Figure 3B:
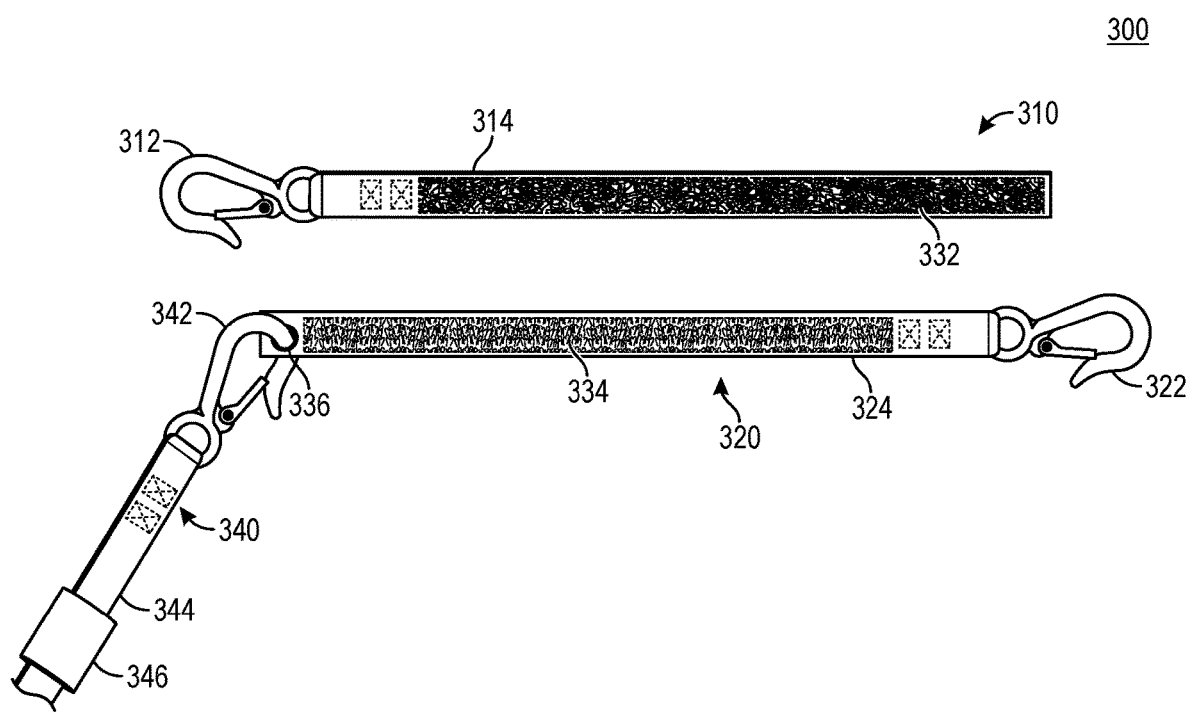

FIGS. 3A and 3B show load restraining apparatus 300 according to another embodiment of the present disclosure. Except where otherwise noted, reference numerals preceded by the number "3" shown in FIGS. 3A and 3B indicate components or features that are similar to components or features having reference numerals preceded by the number "1" in FIGS. 1A and 1B.

FIGS. 3A and 3B show load restraining apparatus 300 according to another embodiment of the present disclosure. Similar to load restraining apparatus 100 and 200 shown in FIGS. 1A, 1B, 2A, and 2B, load restraining apparatus 300 shown in FIGS. 3A and 3B can include first member 310, second member 320, third member 340, and a linking assembly. FIG. 3A shows load restraining apparatus 300 in a coupled arrangement, where the linking assembly is engaged such that first member 310 is coupled to second member 320. Conversely, FIG. 3B shows load restraining apparatus 300 in a decoupled arrangement, where the linking assembly is disengaged such that first member 310 is not coupled to second member 320. FIGS. 3A and 3B also show third member 340 coupled to the second member 320. Alternatively, third member 340 can be coupled to first member 310. As load restraining apparatus 300 may be used to restrain unsecured freight in a trailer, load restraining apparatus 300, including first member 310, second member 320, and the linking assembly, are preferably constructed (and include components) to provide sufficient tensile strength to restrain loads of 500 lbs., 800 lbs., 1,000 lbs., 2,000 lbs., 2,500 lbs., 5,000 lbs., 10,000 lbs., or more.

As shown in FIGS. 3A and 3B, first member 310 can include securing assembly 312 and band portion 314. Similarly, second member 320 can include securing assembly 322 and band portion 324. Securing assembly 312 can be coupled to a first end of band portion 314 and can allow first member 310 to be secured to an anchor, such as a hasp of a trailer, to couple first member 310 to a rear of the trailer. Similarly, securing assembly 322 can be coupled to a first end of band portion 324 and can allow second member 320 to be secured to an anchor, such as a hasp of the trailer, to couple second member 320 to a rear of the trailer. According to certain embodiments, securing assemblies 312 and 322 can include hooks, carabiners, locking hooks, snap hooks, chains, clips, fasteners, etc. Band portions 314 and 324 can include any material that can provide flexibility and sufficient tensile strength, such as, nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. According to embodiments of the present disclosure, securing assemblies 312 and 322 can be coupled to band portions 314 and 324, respectively, via one or more box stitches. The components, materials, and design of securing assemblies 312 and 322 and band portions 314 and 324 can be modified to obtain the desired tensile strength. For example, a width of band portions 314 and 324 can be selected (e.g., 1 inch, 2 inches, 3 inches, etc.) for a desired tensile strength and the manner in which securing assemblies 312 and 322 are coupled to band portions 314 and 324 (e.g., single box stitches, double box stitches, etc.) can also be modified to achieve a desired tensile strength. According to certain aspects, at least one of first member 310 or second member 320 can include winching or ratcheting mechanism 350 by which a length of first member 310 and/or second member 320 can be adjusted.

As shown in FIGS. 3A and 3B, the linking assembly can provide releasable coupling of first member 310 to second member 320. According to one embodiment of the present disclosure and as shown in FIGS. 3A and 3B, the linking assembly can include a hook-and-loop fastener arranged on band portions 314 and 324. For example, the linking assembly can include first length of hook-and-loop fastener 332 (e.g., a hook portion) disposed on a surface of band portion 314 and a second length of hook-and-loop fastener 334 (e.g., a loop portion) disposed on a surface of band portion 324. Accordingly, the linking assembly can be engaged when first length of hook-and-loop fastener 332 is mated to and engages with second length of hook-and-loop fastener 334. Conversely, the linking assembly can be disengaged from first length of hook-and-loop fastener 332 and separated from and disengaged from second length of hook-and-loop fastener 334. One of first member 310 or second member 320 can also include connector 336, which can provide a connection to third member 340. As described herein, third member 340 can facilitate disengagement of the linking assembly (e.g., to decouple first member 310 from second member 320) at a safe distance from the structure (e.g., trailer) to which load restraining apparatus 300 is secured.

As shown in FIGS. 3A and 3B, third member 340 can include connector 342 and band portion 344 and can be coupled to second member 320 via connector 342 and connector 336. With third member 340 coupled to connector 336, third member 340 can facilitate disengagement of the linking assembly to decouple first member 310 from second member 320 from a safe distance. For example, third member 340 can be coupled to connector 336 via connector 342, and band portion 344 can include a length sufficient to allow an operator of load restraining apparatus 300 to position himself/herself at a safe distance from a rear of the trailer being unloaded, from where he/she can safely perform a controlled fall of any unsecured freight. According to embodiments of the present disclosure, connector 342 can include hooks, carabiners, locking hooks, snap hooks, chains, clips, fasteners, etc. Band portion 344 can include any material that can provide flexibility and sufficient tensile strength, such as, nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. Further, connector 342 can be coupled to band portion 344 via one or more box stitches.

Third member 340 can also include an indicator 346 that can inform the operator when a safe distance has been reached when third member 340 is stretched taut. For example, third member 340 can include a length of 8 feet, 10 feet, 12 feet, 15 feet, 20 feet, 25 feet, or any other length to allow an operator to position himself/herself at a distance of at least 8 feet, 10 feet, feet, 15 feet, 20 feet, 25 feet, or any other distance from a rear of the trailer being unloaded. Alternatively, third member 340 can include a length greater than a desirable safety distance and indicator 346 can be positioned at the desired safety distance (e.g., a distance of 8 feet, 10 feet, 12 feet, 15 feet, 20 feet, 25 feet, or any other distance from connector 342) so that the operator can ascertain the preferred safety distance from the trailer. For example, the operator may move along the length of band portion 344 in a direction away from the rear of the trailer until indicator 346 has been reached.

In operation, load restraining apparatus 300 can be used to perform a controlled fall of unsecured freight that may be leaning against swing doors of a trailer. For example, first member 310 can be coupled to an anchor, such as a hasp of a trailer, via securing assembly 312 and second member 320 can be coupled to a second anchor, such as a second hasp of the trailer, via securing assembly 322. Further, first member 310 may be coupled to second member 320 via the linking assembly and third member 340 may be coupled to connector 336 via connector 342. As the swing doors are opened, any unsecured freight that may be leaning against the doors may force the doors into an open position. In this situation, load restraining apparatus 300 may restrain the load from falling out of the trailer and can maintain the doors in a partially open position. Next, the operator can position himself/herself at a safe distance from the rear of the trailer where he/she can safely perform a controlled fall of the unsecured freight. For example, the operator may move along a length of band portion 344 of third member 340 until at least indicator 346 is reached. This may be at a distance of 8 feet, 10 feet, 12 feet, 15 feet, 20 feet, 25 feet, or any other distance. Preferably, the operator would be at a distance of at least 8 feet from the rear of the trailer. From this distance, the operator can apply a force to third member 340, which can cause first length of hook-and-loop fastener 332 to become separated from and disengaged from second length of hook-and-loop fastener 334 to disengage the linking assembly, and thereby decoupling first member 310 from second member 320, thus allowing the doors of the trailer to open further and allow the freight to fall from the trailer while the operator is at a safe distance from the trailer.

Figure 4A:
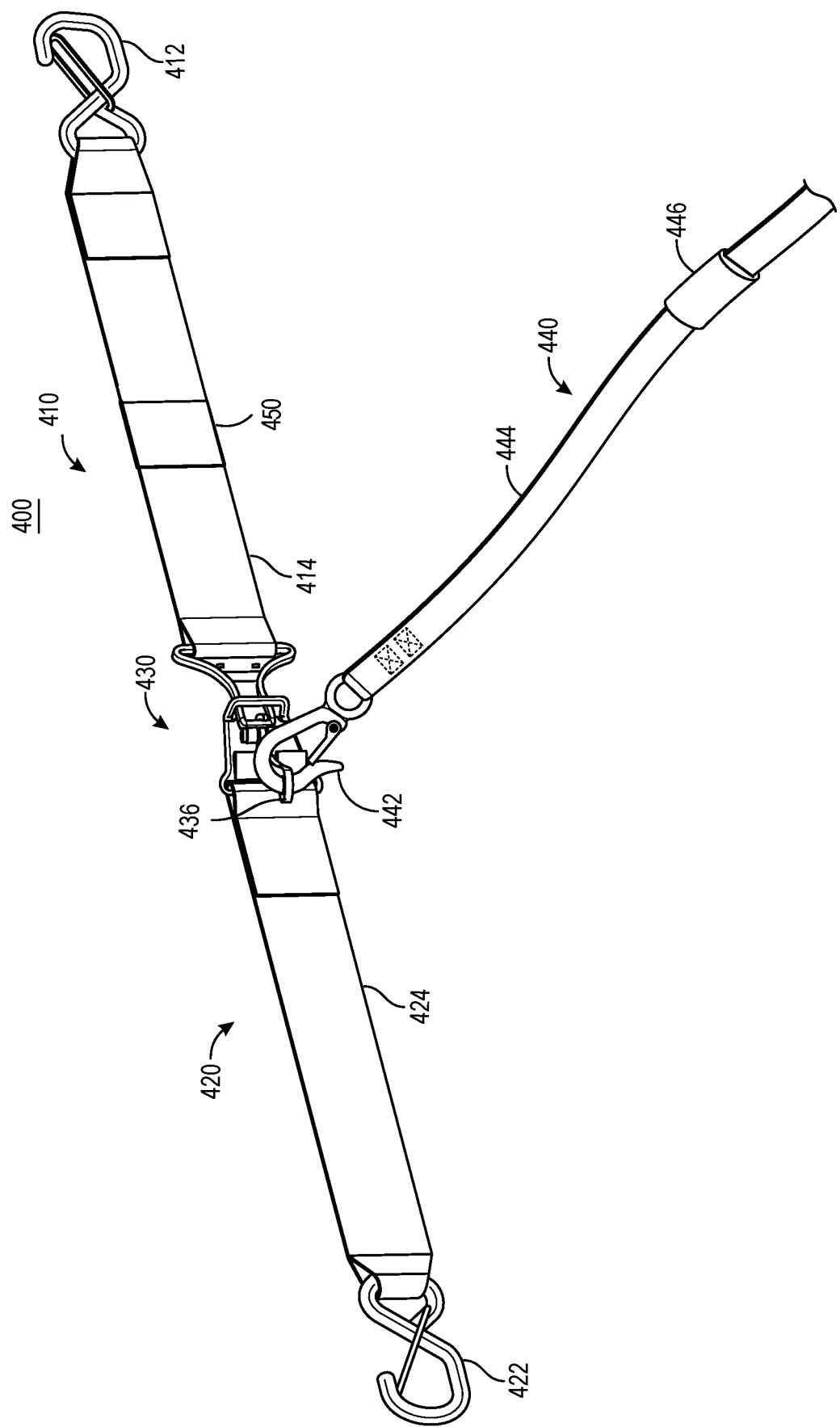
FIGS. 4A, 4B, and 4C are illustrations of an exemplary load restraining apparatus in accordance with embodiments of the present disclosure.
Figure 4B:
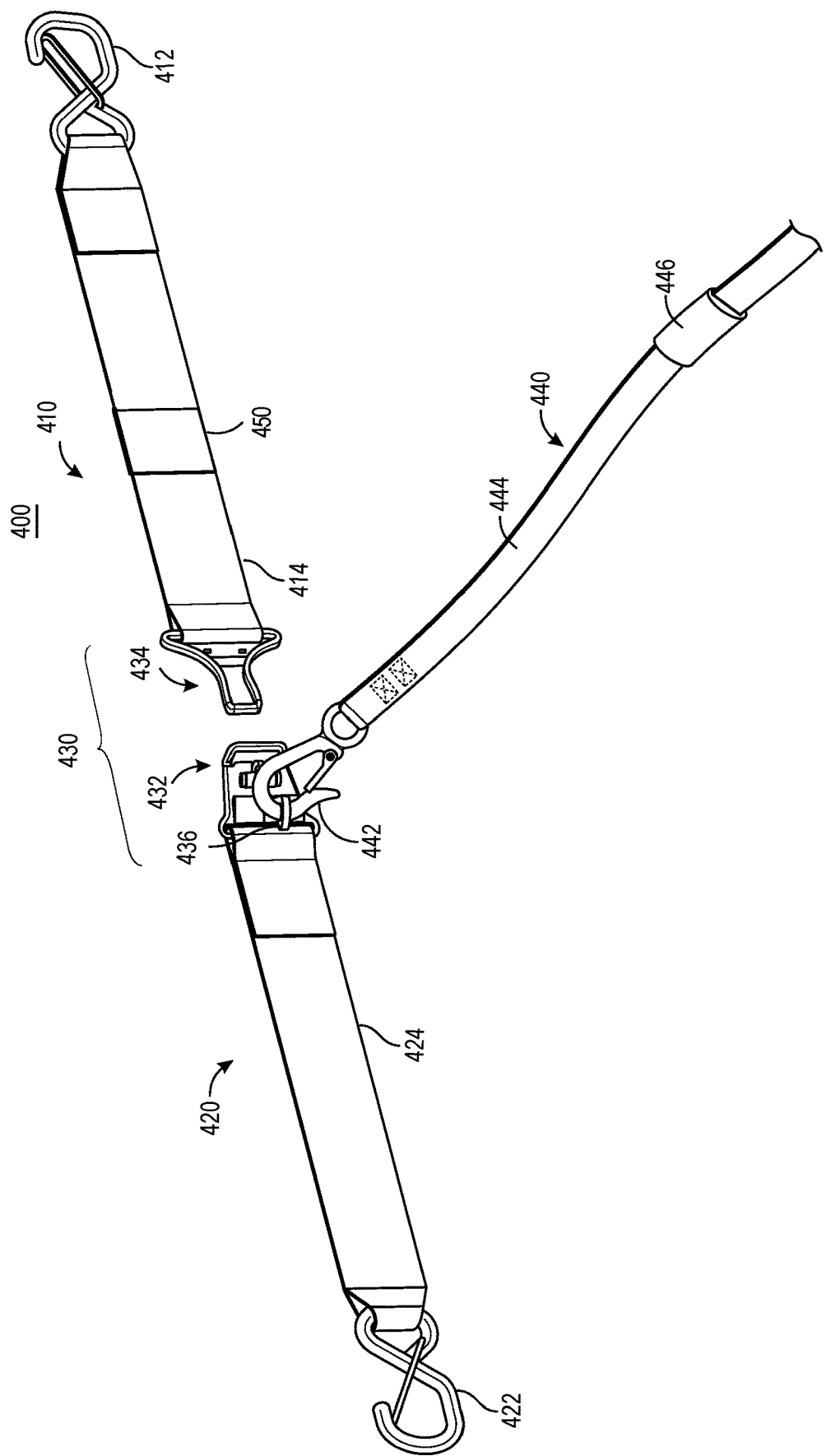
Figure 4C:
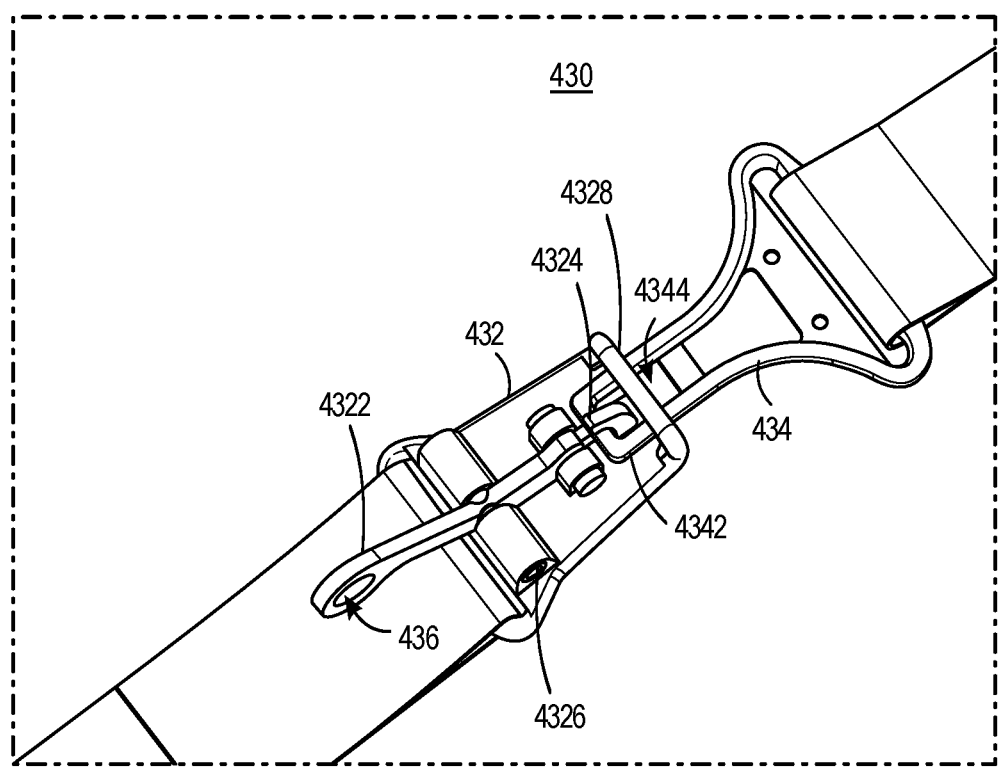

FIGS. 4A, 4B, and 4C show load restraining apparatus 400 according to another embodiment of the present disclosure. Except where otherwise noted, reference numerals preceded by the number "4" shown in FIGS. 4A, 4B, and 4C indicate components or features that are similar to components or features having reference numerals preceded by the number "1" in FIGS. 1A and 1B.

FIGS. 4A and 4B show exemplary load restraining apparatus 400, in accordance with embodiments of the present disclosure, and FIG. 4C shows a closeup view of linking assembly 430. As shown in FIGS. 4A, 4B, and 4C, load restraining apparatus 400 can include first member 410, second member 420, linking assembly 430, and third member 440. FIGS. 4A and 4C show load restraining apparatus 400 in a coupled arrangement, where linking assembly 430 is engaged such that first member 410 is coupled to second member 420. Conversely, FIG. 4B shows load restraining apparatus 400 in a decoupled arrangement, where linking assembly 430 is disengaged such that first member 410 is not coupled to second member 420. FIGS. 4A and 4B also show third member 440 coupled to linking assembly 430. As load restraining apparatus 400 may be used to restrain unsecured freight in a trailer, load restraining apparatus 400, including first member 410, second member 420, and linking assembly 430, are preferably constructed (and include components) to provide sufficient tensile strength to restrain loads of 500 lbs., 800 lbs., 1,000 lbs., 2,000 lbs., 2,500 lbs., 5,000 lbs., 10,000 lbs., or more.

As shown in FIGS. 4A and 4B, first member 410 can include securing assembly 412 and band portion 414. Similarly, second member 420 can include securing assembly 422 and band portion 424. Securing assembly 412 can be coupled to a first end of band portion 414 and can allow first member 410 to be secured to an anchor, such as a hasp of a trailer, to couple first member 410 to a rear of the trailer. Similarly, securing assembly 422 can be coupled to a first end of band portion 424 and can allow second member 420 to be secured to an anchor, such as another hasp of the trailer, to couple second member 420 to a rear of the trailer. According to certain embodiments, securing assemblies 412 and 422 can include hooks, carabiners, locking hooks, snap hooks, chains, clips, fasteners, etc. Band portions 414 and 424 can include any material that can provide flexibility and sufficient tensile strength, such as nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. According to embodiments of the present disclosure, securing assemblies 412 and 422 can be coupled to band portions 414 and 424, respectively, via one or more box stitches. The components, materials, and design of securing assemblies 412 and 422 and band portions 414 and 424 can be modified to obtain the desired tensile strength. For example, a width of band portions 414 and 424 can be selected (e.g., 1 inch, 2 inches, 3 inches, etc.) for a desired tensile strength and the manner in which securing assemblies 412 and 422 are coupled to band portions 414 and 424 (e.g., single box stitches, double box stitches, etc.) can also be modified to achieve a desired tensile strength. Optionally, at least one of first member 410 or second member 420 can include winching or ratcheting mechanism 450 by which a length of first member 410 and/or second member 420 can be adjusted.

As shown in FIGS. 4A and 4B, linking assembly 430 can be secured to the second ends of first member 410 and second member 420, respectively, to provide releasable coupling of first member 410 to second member 420. Similar to securing assemblies 412 and 422, linking assembly 430 can be coupled to the second ends of first member 410 and second member 420 via one or more box stitches. Linking assembly 430 can also include connector 436, which can provide a connection to third member 440. According to certain embodiments and as shown in FIGS. 4A, 4B, and 4C, linking assembly 430 can include a buckle assembly, which can include lever portion 432 and tongue portion 434. Tongue portion 434 may be configured to be received by and engage with lever portion 432. For example, tongue portion 434 can include tab 4342 with opening 4344 disposed therein, and lever portion 432 can include lever 4322 with protruding element 4324 (e.g., such as a hook). Lever 4322 can be articulated about pivot 4326 between an engaged position and a disengaged position. In the engaged position, tab 4342 of tongue portion 434 can be received by lever portion 432 and protruding element 4324 of lever 4322 can engage with opening 4344 of tongue portion 434. Further, crossbar 4328 can cooperatively maintain engagement of opening 4344 with protruding element 4324. According to certain aspects, lever 4322 can be biased in the engaged position (e.g., via a spring, via tension exerted on the load restraining apparatus, etc.), and lever 4322 of lever portion 432 can be actuated (e.g., rotated) about pivot 4326 to a disengaged position, such that protruding element 4324 disengages opening 4344 of tongue portion 4342 to disengage and release tongue portion 434 from lever portion 432. As also shown in FIGS. 4B and 4C, lever 4322 can include connector 436, which can include, for example, an opening which can receive connector 442.

As shown in FIGS. 4A and 4B, third member 440 can include connector 442 and band portion 444 and can be coupled to linking assembly 430 via connector 436 of linking assembly 430 and connector 442. With third member 440 coupled to linking assembly 430, third member 440 can facilitate disengagement of linking assembly 430 so as to decouple first member 410 from second member 420 from a safe distance. For example, third member 440 can be coupled to linking assembly 430 via connector 442 and connector 436, and band portion 444 can include a length sufficient to allow an operator of load restraining apparatus 400 to position himself/herself at a safe distance from a rear of the trailer being unloaded, from where he/she can safely perform a controlled fall of any unsecured freight. According to embodiments of the present disclosure, connector 442 can include hooks, carabiners, locking hooks, snap hooks, chains, clips, fasteners, etc. Further, band portion 444 can include any material that can provide flexibility and sufficient tensile strength, such as, nylon webbing, nylon rope, nylon cord(s), natural fiber webbing (e.g., cotton, hemp fiber, etc.), natural fiber rope, natural fiber cord(s), plastic webbing (e.g., polypropylene, etc.), plastic rope, plastic cord(s), metals (e.g., aluminum, etc.), composites (e.g., carbon fiber, graphite, etc.), etc. Further, connector 442 can be coupled to band portion 444 via one or more box stitches.

Third member 440 can also include indicator 446 that can inform the operator when a safe distance has been reached when third member 440 is stretched taut. For example, third member 440 can include a length of 8 feet, 10 feet, 12 feet, 15 feet, 20 feet, 25 feet, or any other length to allow an operator to position himself/herself at a distance of at least 8 feet, 10 feet, feet, 15 feet, 20 feet, 25 feet, or any other distance from a rear of the trailer being unloaded. Alternatively, third member 440 can include a length greater than a desirable safety distance and indicator 446 can be positioned at the desired safety distance (e.g., a distance of 8 feet, 10 feet, 12 feet, 15 feet, 20 feet, 25 feet, or any other distance from connector 442) so that the operator can ascertain the preferred safety distance from the trailer. For example, the operator may move along the length of band portion 444 in a direction away from the rear of the trailer until indicator 446 has been reached.

In operation, load restraining apparatus 400 can be used to perform a controlled fall of unsecured freight that may be leaning against swing doors of a trailer. For example, first member 410 can be coupled to an anchor, such as a hasp of a trailer, via securing assembly 412 and second member 420 can be coupled to a second anchor, such as a second hasp of the trailer, via securing assembly 422. Further, first member 410 may be coupled to second member 420 via linking assembly 430 and third member 440 may be coupled to linking assembly 430 via connector 436 of linking assembly 430 and connector 442. As the swing doors are opened, any unsecured freight that may be leaning against the doors may force the doors into an open position. In this situation, load restraining apparatus 400 may restrain the load from falling out of the trailer and can maintain the doors in a partially open position. Next, the operator can position himself/ herself at a safe distance from the rear of the trailer where he/she can safely perform a controlled fall of the unsecured freight. For example, the operator may move along a length of band portion 444 of third member 440 until at least indicator 446 is reached. This may be at a distance of 8 feet, 10 feet, 12 feet, 15 feet, 20 feet, 25 feet, or any other distance. Preferably, the operator would be at a distance of at least 8 feet from the rear of the trailer. From this distance, the operator can apply a force to third member 440, which can be translated to linking assembly 430 to disengage linking assembly 430, thereby decoupling first member 410 from second member 420. For example, in an embodiment where linking assembly 430 includes a buckle assembly, the operator can apply a force in a direction to actuate lever 4322 of lever portion 432 about pivot 4326 to a disengaged position, such that protruding element 4324 disengages opening 4344 of tongue portion 4342 to disengage and release tongue portion 434 from lever portion 432, thereby decoupling first member 410 from second member 420. This permits the doors of the trailer to open further and allows the freight to fall from the trailer while the operator is at a safe distance from the trailer. According to certain embodiments of the present disclosure, under a load of approximately 500 lbs., tongue portion 434 can be disengaged from lever portion 432 via application of a force of approximately 25 lbs., 50 lbs., 75 lbs., 100 lbs., or more.

Figure 5A:
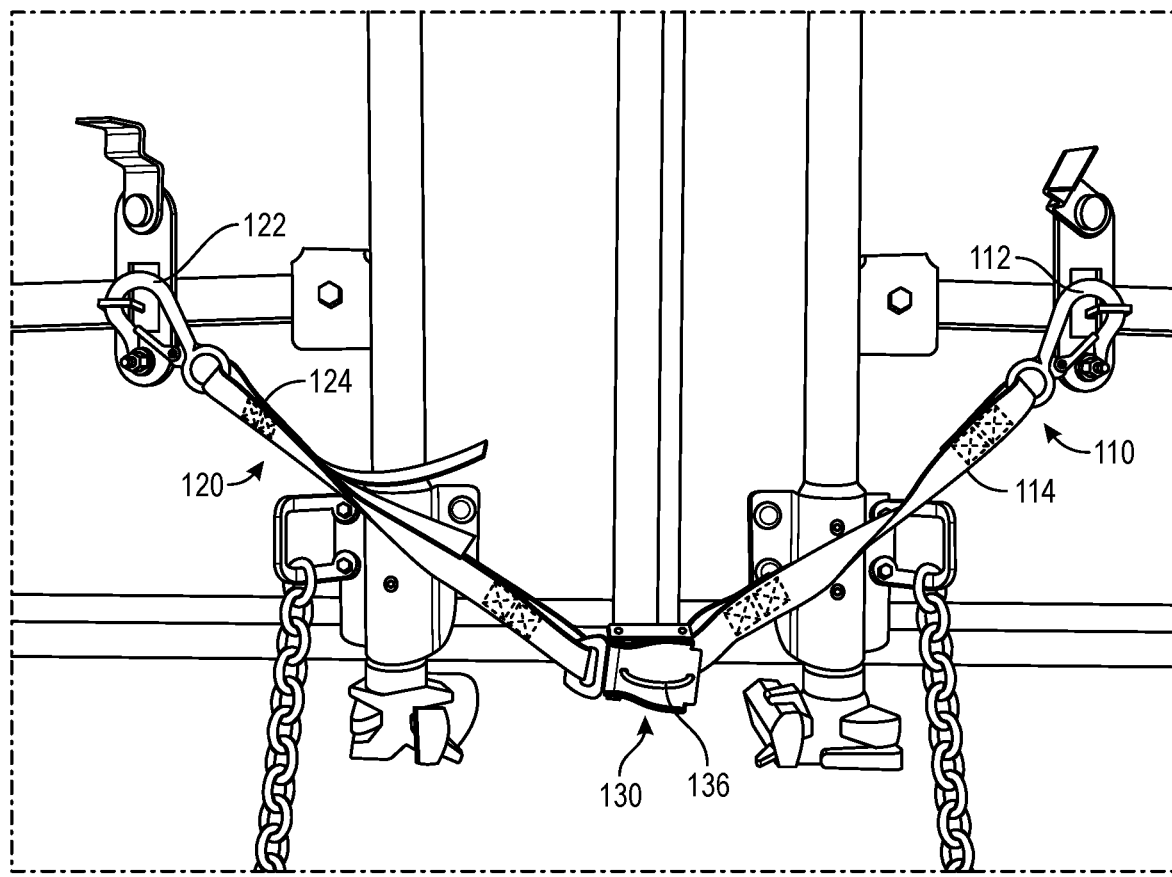
FIGS. 5A, 5B, 5C, and 5D are illustrations of an exemplary load restraining apparatus in use in accordance with embodiments of the present disclosure.

FIGS. 5A, 5B, 5C, and 5D show exemplary load restraining apparatus 100 in use. FIG. 5A shows an initial arrangement of certain components of load restraining apparatus 100. Specifically, as shown in FIG. 5A, first member 110 is coupled to a hasp of a trailer via securing assembly 112 and second member 120 is coupled to a second hasp of the trailer via securing assembly 122. Further, first member 110 is coupled to second member 120 via linking assembly 130.

Figure 5B:
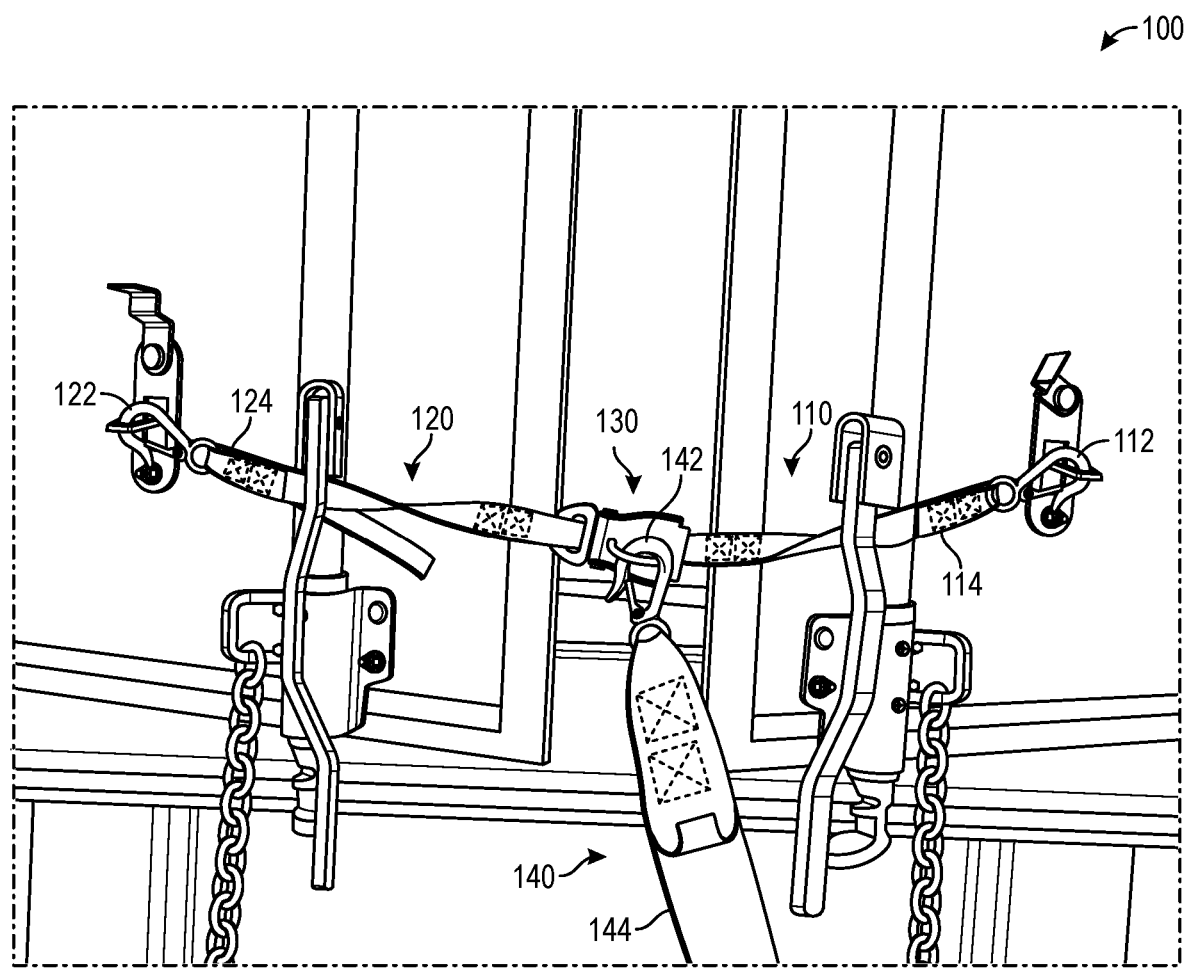
Figure 5C:
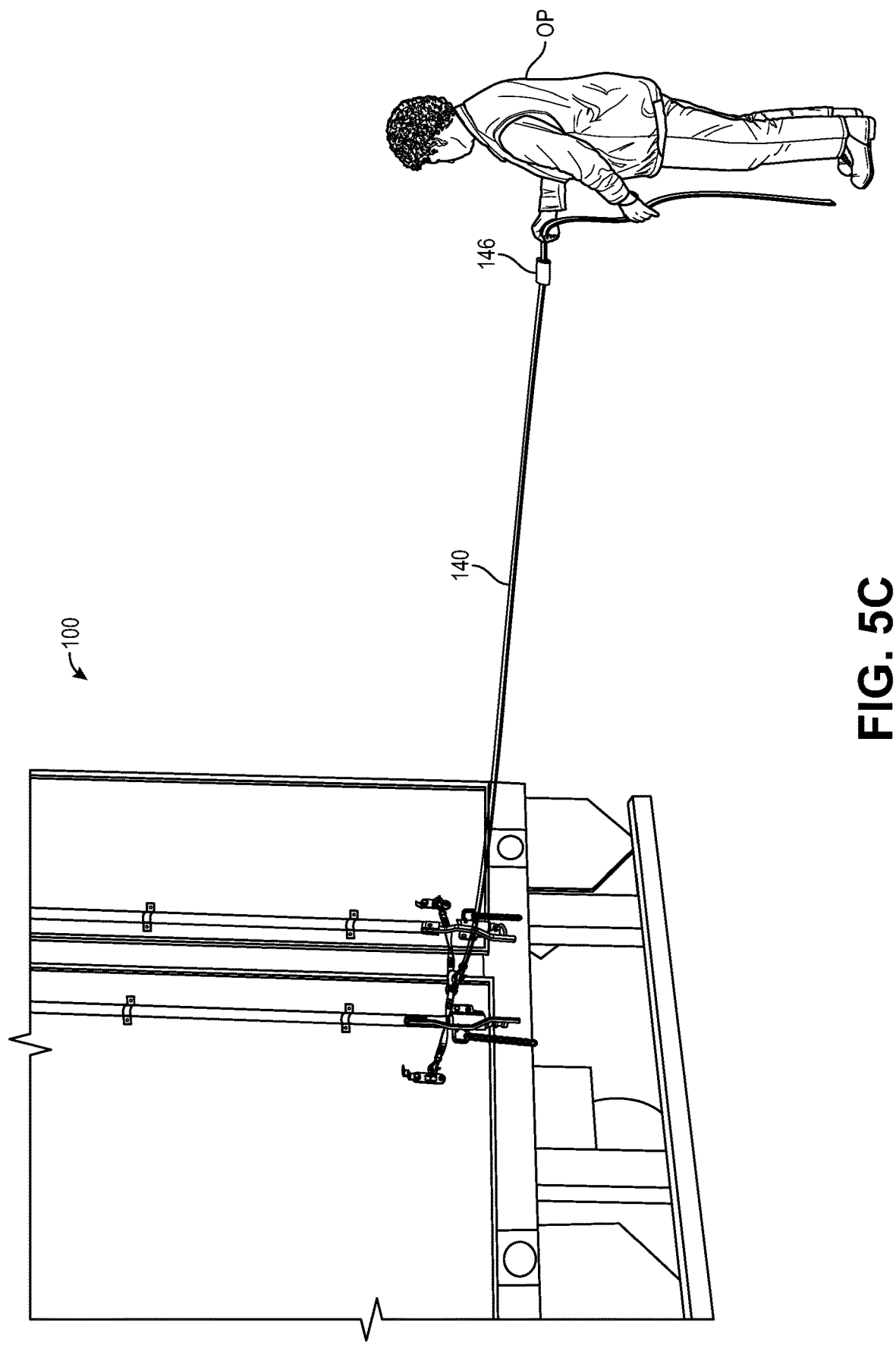

FIG. 5B shows a view similar to that shown in FIG. 5A, where first member 110 is coupled to the hasp of the trailer via securing assembly 112 and second member 120 is coupled to the second hasp of the trailer via securing assembly 122, and first member 110 is coupled to second member 120 via linking assembly 130. Additionally, FIG. 5B shows third member 140 coupled to linking assembly 130. FIG. 5C shows the arrangement of load restraining apparatus 100 shown in FIG. 5B with operator OP holding third member 140 at a distance from the rear of the trailer. As with FIGS. 5A and 5B, first member 110 is coupled to the hasp of the trailer via securing assembly 112 and second member 120 is coupled to the second hasp of the trailer via securing assembly 122, and first member 110 is coupled to second member 120 via linking assembly 130.

Figure 5D:
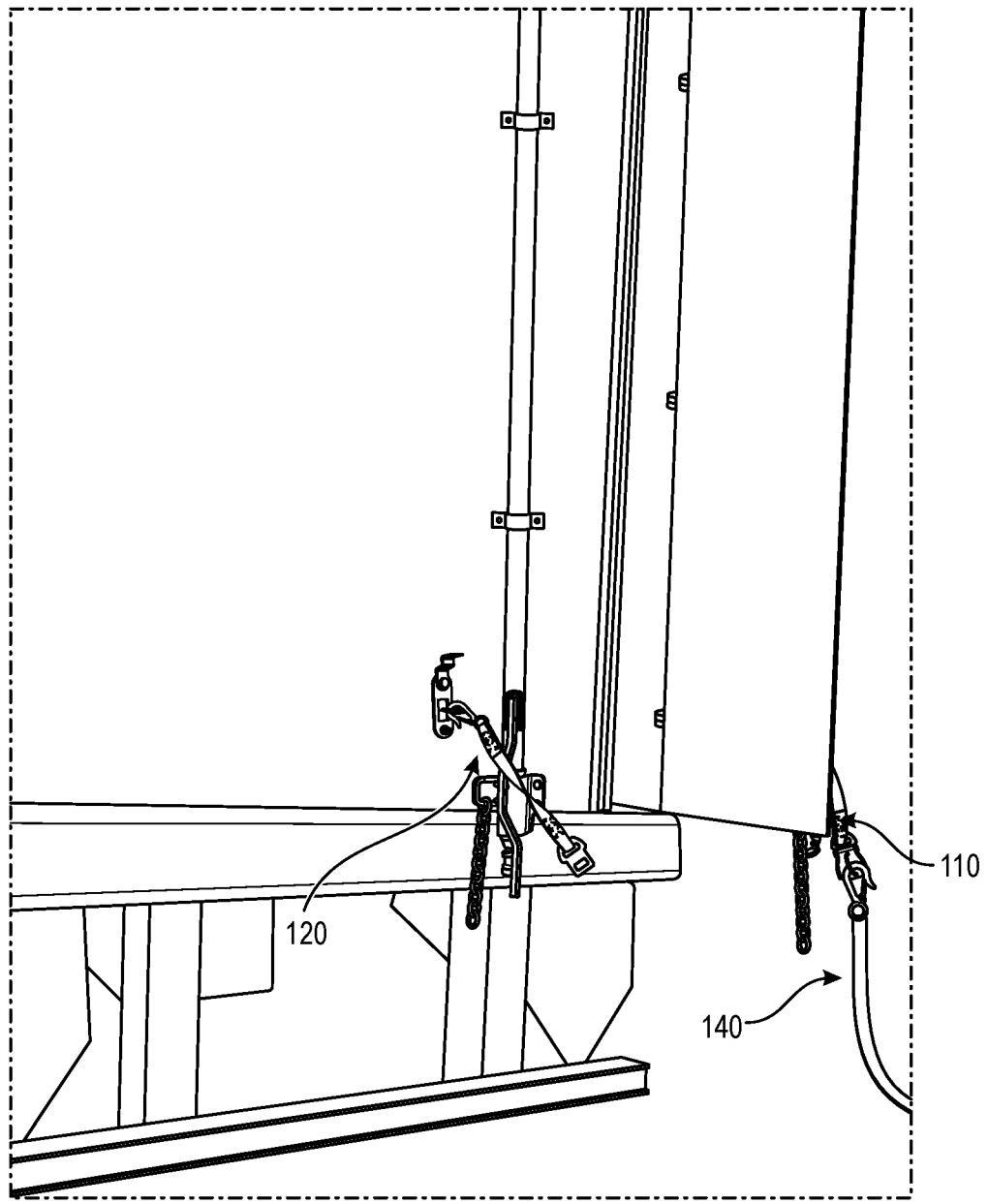

FIG. 5D shows load restraining apparatus 100 after linking assembly 130 has been disengaged via third member 140. As shown in FIG. 5D, first member 110 and second member 120 are still coupled to the trailer and third member 140 is coupled to second member 120, however, linking assembly 130 is disengaged such that first member 110 is decoupled from second member 120. Accordingly, FIG. 5D may illustrate a state of load restraining apparatus 100 after a force was applied to third member 140 to disengage linking assembly 130 to decouple first member 110 from second member 120.

Figure 6:
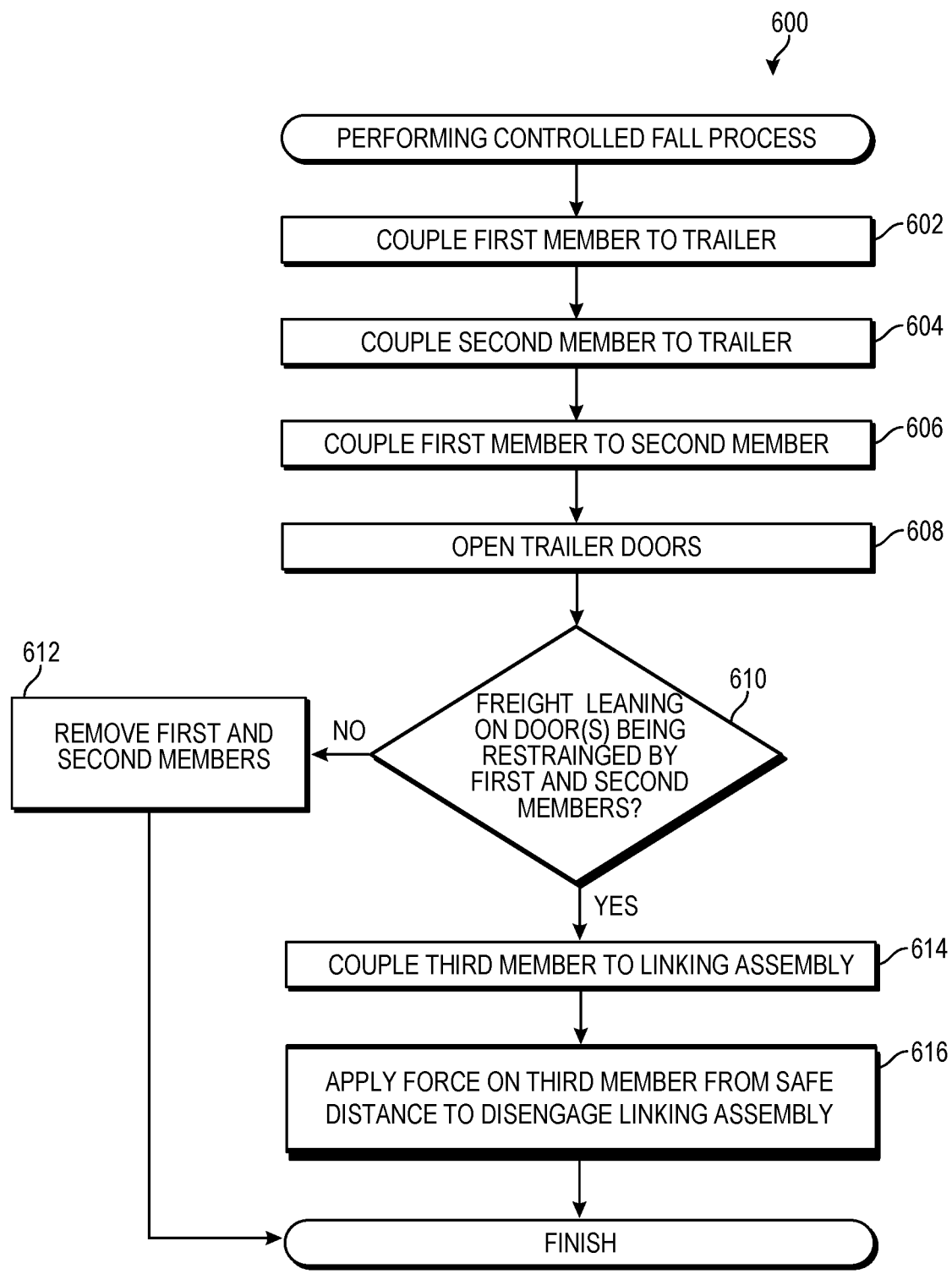
FIG. 6 is a flow diagram of an exemplary process for performing a controlled fall in accordance with embodiments of the present disclosure.

FIG. 6 is a flow diagram of an exemplary process 600 for performing a controlled fall of unsecured freight. As shown in FIG. 6, process 600 can begin with step 602 where first member 110 of load restraining apparatus 100 is coupled to a trailer. For example, securing assembly 112 can be coupled to a hasp of a trailer. In step 604, second member 120 can be coupled to the trailer. Similarly, securing assembly 122 can be coupled to a second hasp of the trailer. After first member 110 and second member 120 have been coupled to the trailer, first member 110 is coupled to second member 120 in step 606. Alternatively, first member 110 can be coupled to second member 120 before first member 110 and/or second member 120 are coupled to the trailer. According to certain embodiments, first member 110 is coupled to second member 120 via linking assembly 130, as described herein. In step 608, the doors of the trailer may be opened. After the doors have been opened, first member 110 and second member 120 may restrain any unsecured freight that may have been leaning against the trailer doors from forcing the doors into a further open position and from falling out of the trailer (step 610). Alternatively, if any unsecured freight had not been leaning on the doors, first member 110 and second member 120 of load restraining apparatus 100 may not be restraining any freight (step 610). Accordingly, first member 110 and second member 120 of load restraining apparatus 100 can be removed from the trailer and the doors of the trailer may be opened normally in step 612. Alternatively, in the event that unsecured freight had been leaning on the doors and the freight is being restrained by load restraining apparatus 100, in step 614, third member 140 may be coupled to linking assembly 130. According to aspects of the present disclosure, third member 140 may be coupled to linking assembly 130 at any point during process 600. In step 616, a force may be applied on third member 140 from a safe distance, thereby disengaging linking assembly 130 to decouple first member 110 from second member 120, thus allowing the doors of the trailer to open further and allow the freight to fall from the trailer while the operator is at a safe distance from the trailer.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A load restraining apparatus, comprising:
a first member having a first end and a second end;
a second member having a first end and a second end;
a first securing assembly coupled to the first end of the first member, wherein the first securing assembly is configured to releasably couple the first member to a first anchor;
a second securing assembly coupled to the first end of the second member, wherein the second securing assembly is configured to releasably couple the second member to a second anchor;
a buckle assembly configured to releasably couple the second end of the first member to the second end of the second member, the buckle assembly including a lever portion coupled to the second end of the first member and a tongue portion coupled to the second end of the second member, wherein the lever portion is configured to receive and engage the tongue portion; and
a third member coupled to the lever portion of the buckle assembly and configured to disengage, from a location remote from the first and second anchors, the tongue portion from the lever portion, wherein a force applied via the third member on the lever portion releases the lever portion, thereby disengaging the tongue portion from the lever portion while the load restraining apparatus is under load so as to decouple the second end of the first member from the second end of the second member.

2. The load restraining apparatus of claim 1, wherein the first anchor and the second anchor include hasps of a trailer.

3. The load restraining apparatus of claim 1, wherein the third member includes a length such that the location remote from the first anchor and the second anchor includes a distance of at least approximately eight feet from the buckle assembly.

4. The load restraining apparatus of claim 1, wherein the first securing assembly and the second securing assembly include at least one of a carabiner, a hook, a locking hook, a snap hook, or a chain.

5. The load restraining apparatus of claim 1, wherein the lever portion of the buckle assembly includes a lever and an opening disposed therein, and the third member includes a hook configured to engage the opening of the lever portion.

6. A load restraining apparatus, comprising:
a first member having a first securing member configured to engage a first anchor;
a second member having a second securing member configured to engage a second anchor;
a linking assembly coupling the first member to the second member; and
a third member configured to enable disengagement, from a location remote from the first anchor and the second anchor, of the linking assembly so as to decouple the first member from the second member while the load restraining apparatus is under a load.

7. The load restraining apparatus of claim 6, wherein the linking assembly includes:
a first loop formed in a first end of the first member;
a second loop formed in a first end of the second member; and
a pin threaded through the first loop and the second loop.

8. The load restraining apparatus of claim 7, wherein the third member includes a rip cord coupled to the pin and a force applied to the pin via the rip cord releases the pin from the first loop and the second loop, thereby decoupling the first member from the second member.

9. The load restraining apparatus of claim 6, wherein the linking assembly includes a hook-and-loop fastener disposed along a length of the first member and the second member.

10. The load restraining apparatus of claim 6, wherein the third member includes a hook which couples to a connector disposed on the linking assembly.

11. The load restraining apparatus of claim 10, wherein the first member and the second member include a nylon strap, and the linking assembly includes a lever portion and a tongue portion, the lever portion coupled to the first member via at least one box stitch and the tongue portion coupled to the second member via at least one box stitch.

12. The load restraining apparatus of claim 6, wherein the linking assembly includes a buckle assembly having a lever portion coupled to the first member and a tongue portion coupled to the second member, the lever portion configured to receive and releasably engage the tongue portion.

13. The load restraining apparatus of claim 6, wherein the third member includes an indicator indicating a safe distance from the first anchor and the second anchor.

14. The load restraining apparatus of claim 6, further comprising a winching or ratcheting assembly configured to adjust a length of at least one of the first member or the second member.

15. The load restraining apparatus of claim 6, wherein the first anchor and the second anchor include hasps of a trailer.

16. The load restraining apparatus of claim 6, wherein the third member includes a length such that the location remote from the first anchor and the second anchor includes a distance of at least approximately eight feet from the first anchor and the second anchor.

17. A method for performing a controlled fall of unsecured freight leaning against a swing door of a trailer, the method comprising:
coupling a first member to a first hasp of the trailer;

coupling a second member to a second hasp of the trailer;
coupling the first member to the second member via a linking assembly configured to decouple the first member and the second member while under a load;
coupling a third member to the linking assembly; and
applying a force, from a location remote from a rear of the trailer, on the third member to release the linking assembly, thereby decoupling the first member from the second member.

18. The method of claim 17, further comprising opening the swing door of the trailer.

19. The method of claim 17, wherein the linking assembly includes a buckle assembly, the buckle assembly including a lever portion coupled to the first member and a tongue portion coupled to the second member.

20. The method of claim 17, wherein the third member is coupled to the linking assembly and is configured such that the location remote from the rear of the trailer includes a distance of at least approximately eight feet from the rear of the trailer.

* * * * *